United States Patent [19]

Muryoi et al.

[11] Patent Number: 4,757,335
[45] Date of Patent: Jul. 12, 1988

[54] EXTENDER-CONTAINING CAMERA LENS WITH A GRIP

[75] Inventors: Takeshi Muryoi, Chigasaki; Yasunobu Shinpo, Tokyo, both of Japan

[73] Assignee: Nippon Kogaku K. K., Tokyo, Japan

[21] Appl. No.: 29,439

[22] Filed: Mar. 23, 1987

[30] Foreign Application Priority Data

Apr. 4, 1986 [JP] Japan .................................. 61-77905
Apr. 4, 1986 [JP] Japan .................................. 61-77906

[51] Int. Cl.⁴ ....................... G03B 29/00; G03B 17/02
[52] U.S. Cl. ........................................ 354/82; 354/288
[58] Field of Search ............... 354/288, 82; 350/256, 350/246

[56] References Cited

U.S. PATENT DOCUMENTS 3,078,757  2/1963  Austin et al. .................... 354/288 X
4,063,263 12/1977  Krewalk .......................... 350/256 X
4,095,244  6/1978  Yokoyama et al. ................... 354/82

FOREIGN PATENT DOCUMENTS 871489  6/1961  United Kingdom ................ 354/288
934033  8/1963  United Kingdom ................ 354/288

Primary Examiner—Donald A. Griffin
Attorney, Agent, or Firm—Shapiro and Shapiro

[57] ABSTRACT

A lens device provided with a photo-taking optical system and a barrel holding the photo-taking optical system therein has an auxiliary optical system insertable into and retractable from the optical path of the photo-taking optical sytem, and grip means protruding from the outer wall of the barrel in order that the user may hold the barrel, the grip means having containing means for containing therein the auxiliary optical system when retracted from the optical path of the photo-taking optical system.

12 Claims, 3 Drawing Sheets

EXTENDER-CONTAINING CAMERA LENS WITH A GRIP

BACKGROUND OF THE INVENTION

1. Field of the Invention

This invention relates to a camera lens which is provided with a holding grip called a lens grip by the side of a barrel and which contains therein an extender optical system for extending the focal length and other optical system and in which the optical systems are provided insertably into and removably from the optic axis of a photo-taking optical system (hereinafter referred to as "the extender-containing camera lens with a grip").

2. Related Background Art

The lens shown in FIGS. 1A and 1B of the accompanying drawings is a prior-art extender-containing camera lens with a grip. This camera lens with a grip is indispensable to the recent portable television cameras, particularly, ENG (electronic news gathering) cameras.

In FIGS. 1A and 1B, reference numeral 1 designates a lens barrel, and reference numeral 2 denotes a lens grip comprising a body 2a fixed to the lens barrel 1 and a removable grip cover 2b of readily graspable shape. Reference numeral 3 designates a removably insertable portion of an extender optical system which is a part of the lens barrel, reference numeral 4 denotes the extender optical system, and reference numeral 6 designates a change-over lever for operating the extender optical system. The extender optical system 4 may be inserted into a position 5a in the optic axis of the photo-taking optical system by the change-over lever 6 being pivotally moved, and may be retracted to a position 5b outside the optic axis. Reference numeral 7 denotes a mount for mounting the lens onto a camera, reference numeral 8 designates a belt, reference numeral 9 denotes a pad to which the back of a hand may be applied to support, and SW1–SW4 designate various switches. SW1 is a zoom seesaw control switch, SW2 is an iris momentary switch, SW3 is an external picture switch, and SW4 is a VTR switch. Reference character 10a denotes a zoom ring, and reference character 11a designates an aperture ring. Various mechanisms are contained in the lens grip 2. Reference character 10b denotes a zoom position detecting element, reference character 11b designates a diaphragm position detecting element, reference character 10c denotes a zoom drive motor, and reference character 11c designates a diaphragm driving motor.

The extender-containing camera lens with a grip as described above is mounted on a television camera on band (such as an ENG camera or a household video camera). Each of most users (cameramen) places the camera body (not shown) on his right shoulder and levels the camera with the right-hand lens grip of the lens barrel as viewed from the camera side being grasped by his right hand. The user operates the zoom seesaw control switch SW1 and pushes button switches SW2 and SW3 by the index finger and middle finger of his right hand and operates the push button switch SW4 by the thumb of his right hand. Further, he pivotally operates the change-over lever 6 to effect insertion and retraction of the extender optical system 4 and change over the focal length of the photo-taking optical system. By his left hand, be rotatively operates the operating member of the lens barrel 1, such as the focusing ring or the zooming ring.

Such a prior-art extender-containing camera lens with a grip is designed such that when the camera is not in use, the extender optical system 4 is retracted to the side opposite to the side on which the lens grip 2 is provided, i.e., the left side of the lens barrel 1 as viewed from the camera side. Accordingly, the bulged portion 3a of the removably insertably portion 3 of the extender optical system protrudes to the left side of the lens barrel 1.

When the cameraman places a television camera provided with such lens on his right shoulder as previously described and tries to operate the operating member of the lens barrel 1, such as the focusing ring or the zooming ring, by his left hand, a problem may arise in that the movement and position of the left hand is limited by the bulged portion 3a and that even if he tries to see the index mark or the scale indicated on the lens barrel 1 during photography, his view is obstructed by the bulged portion 3a to make it difficult to see the index mark or the scale.

Furthermore, the bulged portion 3a of the removably insertable portion 3 of the extender optical system forms a part of the lens barrel 1 and therefore, sufficient strength and rigidity are required of it, and if these requirements are met, the weight of the bulged portion 3a will become heavy. Also, in the prior-art lens with a grip, whether it is or is not provided with an extender, the grip 2 is attached to the lens barrel 1 by means of a screws as shown in FIG. 1B. If at this time, the camera is supported by the grip, the supporting force will be exerted on the lens barrel. Accordingly, in the prior-art lens with a grip, the strength and rigidity of the lens barrel 1 must be made high and thus, the weight of the entire lens barrel becomes heavy. Particularly, if such a prior-art lens is mounted on a portable camera, there will arise a problem that the balance with which the camera is leveled is aggravated to make the camera difficult to use.

SUMMARY OF THE INVENTION

The present invention solves these problems and provides an extender-containing camera lens with a grip in which the bulged portion 3a of the removably insertable portion of the extender optical system is not a hindrance to photography and which is light in weight.

The technical gist of the present invention resides in that design is made such that when the extender optical system is to be retracted to a position outside the optic axis of the photo-taking optical system, it is retracted toward the lens grip.

DESCRIPTION OF THE PREFERRED EMBODIMENTS

Figure 1A:
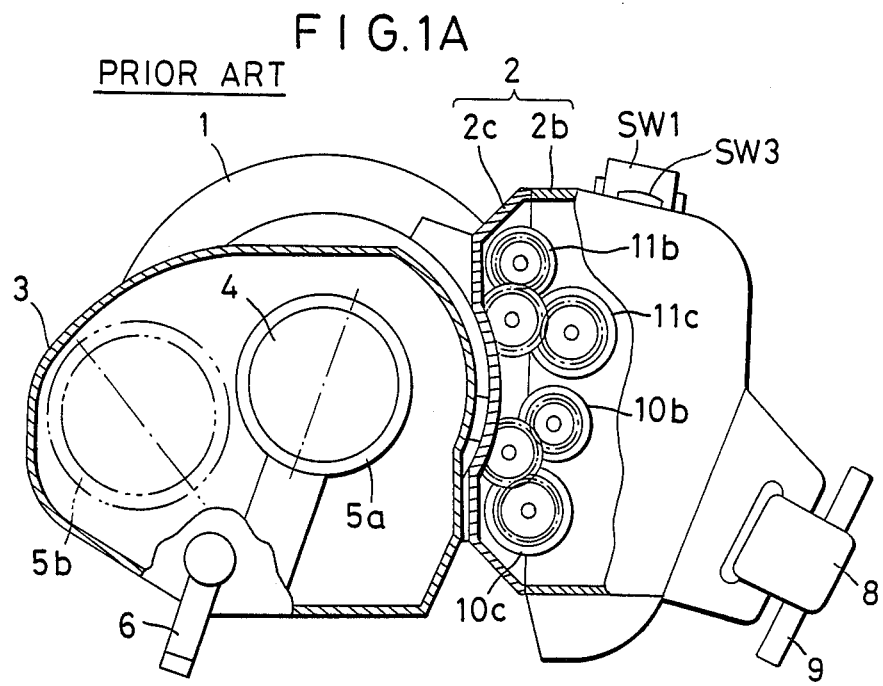
FIG. 1A is a partly cross-sectional view of an extender-containing camera lens with a grip according to the prior art.
Figure 1B:
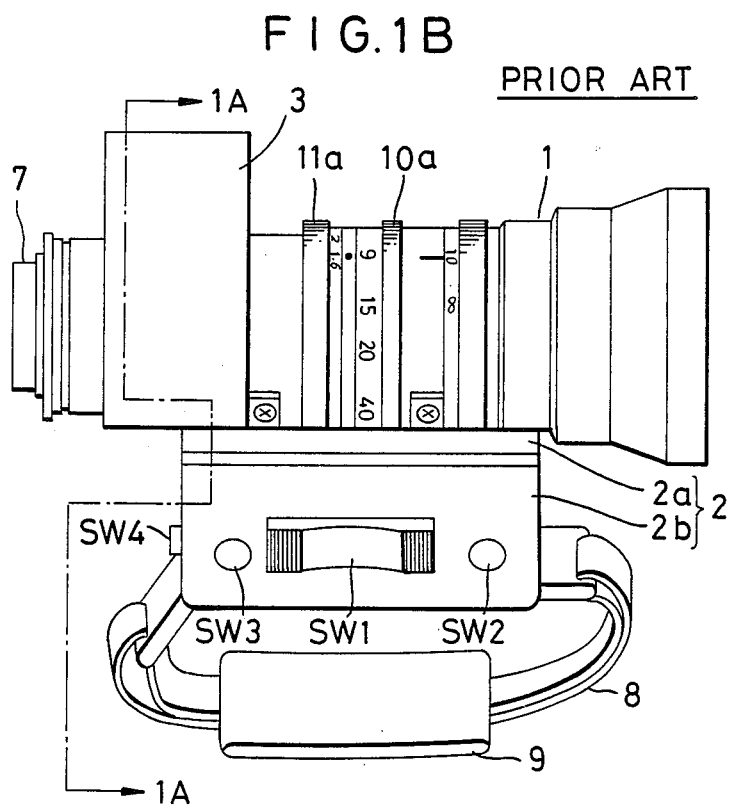
FIG. 1B is a plan view of the extender-containing camera lens with a grip according to the prior art.
Figure 2A:
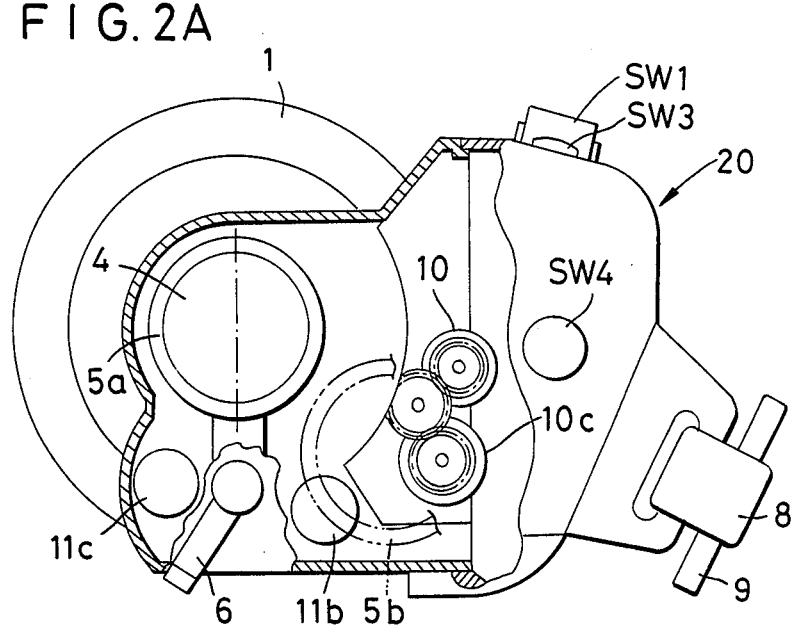
FIG. 2A is a partly cross-sectional view of an extender-containing camera lens with a grip according to a first embodiment of the present invention.
Figure 2B:
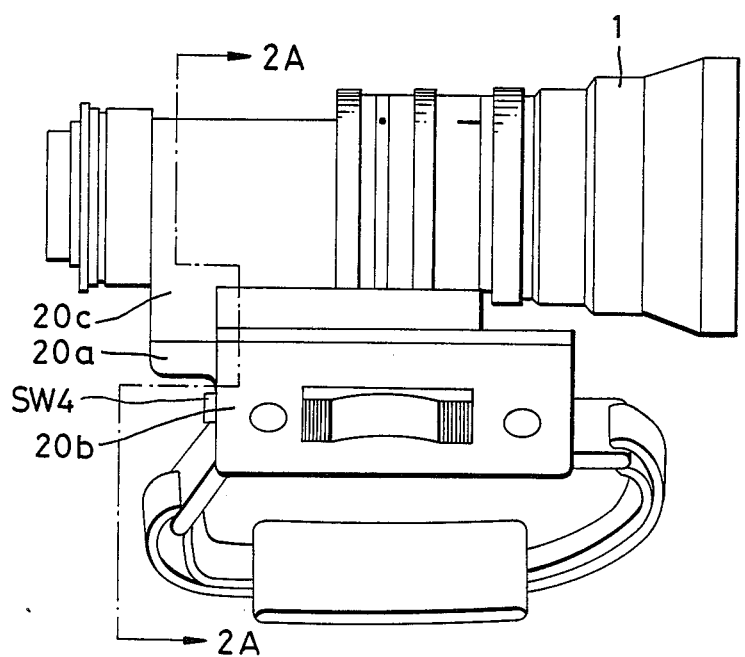
FIG. 2B is a plan view of the extender-containing camera lens with a grip according to the first embodiment of the present invention.
Figure 3A:
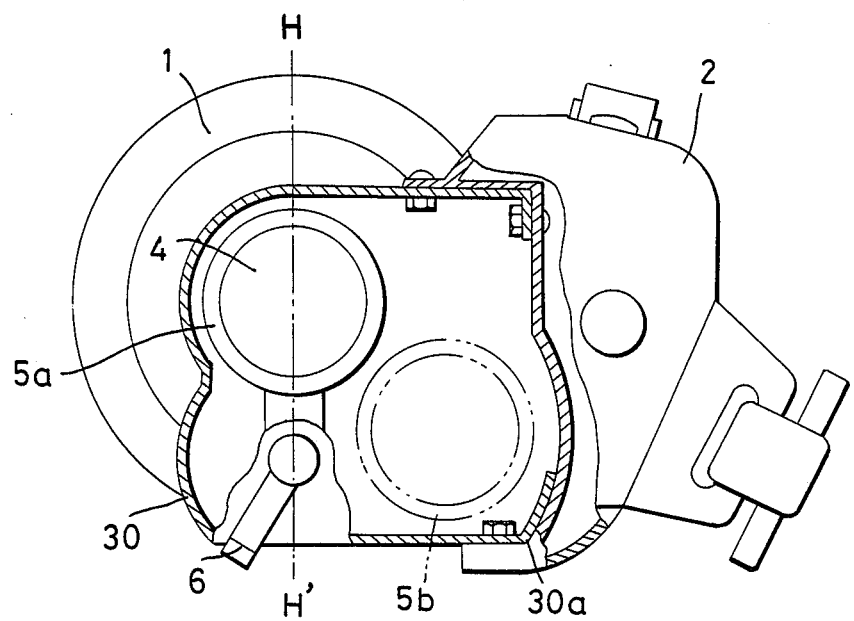
FIG. 3A is a partly cross-sectional view of an extender-containing camera lens with a grip according to a second embodiment of the present invention.

In FIGS. 2A, 2B, 3A and 3B, reference characters similar to those in FIGS. 1A and 1B respectively designate similar members, and the method of using the lens itself and the method of operating the lens are also similar to those according to the prior art and bear little relation to the gist of the present invention and therefore, the operations of individual parts need not be described herein. FIG. 2A is a cross-sectional view taken along line 2A—2A of FIG. 2B, and FIG. 3A is a cross-sectional view taken along line 3A—3A of FIG. 3B.

(First Embodiment)

The difference of an extender-containing camera lens with a grip according to the present invention shown in FIGS. 2A and 2B from the extender-containing camera lens with a grip according to the prior art is, that when an extender optical system 4 is to be retracted to a position outside the optic axis of a photo-taking optical system, it is retracted into the interior of a lens grip 20 and the removably insertable portion of the extender optical system is made integral with the lens grip. Reference character 20a designates the bulged portion of the rear end (adjacent to the camera side) of the lens grip 20. The extender optical system 4 retracted to a position 5b outside the optic axis of the photo-taking optical system is contained in the bulged portion 20a. Therefore, the arrangement of a diaphragm position detecting element 11b and a diaphragm driving motor 11c differs from that in the prior art.

When the extender optical system 4 is to be retracted to the position 5b outside the optic axis of the photo-taking optical system, it is retracted into the interior of the bulged portion 20a of the lens grip 20, with a result that the removably insertable portion 3 of the extender optical system does not protrude to the cameraman side of the lens barrel and is not a hindrance to the cameraman.

Also in the present embodiment, the outer wall of the lens barrel 1 and of the removably insertable portion 20 of the extender optical system has a portion with which the grip may be in contact. The outer wall of the portion covered with the grip may be omitted and formed into an opening, thereby contributing to a lighter weight.

By the lens grip being made integral with the removably insertably portion of the extender optical system, the portion which has heretofore been discrete, such as the engaging member between the lens barrel 1 and the grip 20, can be made integral with the grip to simplify the structure. Also, the removably insertable portion of the extender optical system is situated at the rear portion of the lens barrel and is proximate to the mount of the camera. Thus, where the lens grip is made integral with the removably insertable portion of the extender optical system, the portion on which a force supporting the camera by the grip is exerted, is only the portion from the removably insertable portion of the extender optical system to the mount, and such force is not exerted on the portion of the lens barrel which is forward thereof. Accordingly, the forward portion of the lens barrel can be made lighter in weight.

(Second Embodiment)

Figure 3B:
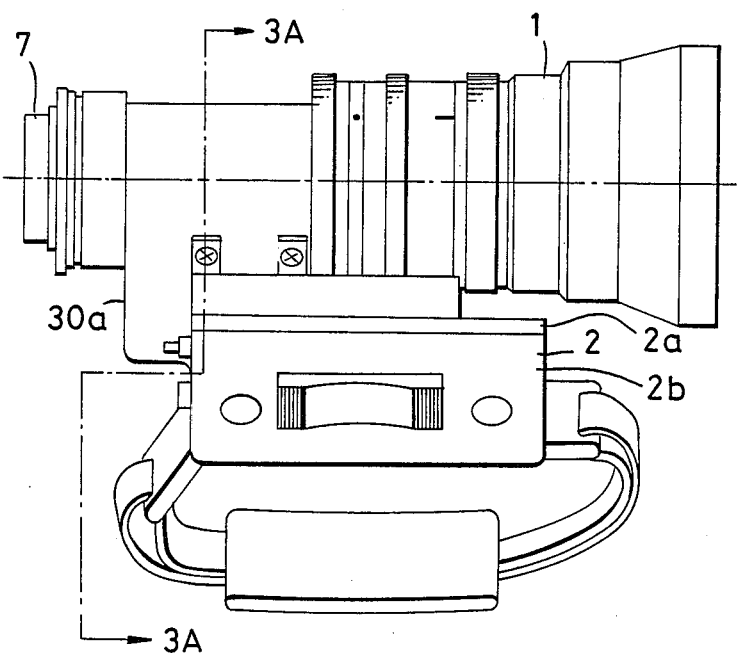
FIG. 3B is a plan view of the extender-containing camera lens with a grip according to the second embodiment of the present invention.

The extender-containing camera lens with a grip according to the present invention shown in FIGS. 3A and 3B is designed such that when the extender optical system 4 is to be retracted to the position 5b outside the optic axis of the photo-taking optical system, it is retracted into the interior of a bulged portion 30a provided on that side on which the lens grip 2 is provided relative to a vertical plane H—H' containing the optic axis. As a result, the bulged portion 30a of the removably insertable portion 30 of the extender optical system does not protrude to the cameraman side of the lens barrel and does not obstruct the cameraman's view.

Further, the present embodiment is of a construction in which the grip contacts the outer wall of the lens barrel 1 and of the removably insertable portion 30 of the extender optical system and therefore, the outer wall of the portion covered with the grip can be omitted and formed into an opening, thereby contributing to a lighter weight.

When mounting the lens grip 2 on the lens barrel 1, a force supporting the camera by the grip is exerted chiefly on the portion from the removably insertable portion 30 of the extender optical system to the mount 7 because the major mounting portion of the lens grip is provided by the removably insertable portion 30 of the extender optical system and the bulged portion 30a, and the force exerted on the forward portion of the lens barrel is smaller than the force exerted on the removably insertable portion 30 of the extender optical system. Accordingly, the forward portion of the lens barrel can be made lighter in weight.

As described above, in the present invention, when the cameraman places the camera body on his right shoulder and levels the camera by grasping the lens grip in his camera side hand and operates the operating member (such as the focusing ring or the zooming ring) of the lens barrel by his other hand in that state, the extender optical system containing portion is not a hindrance to him and with the camera leveled as described above, the index mark or the scale indicated on the lens barrel 1 does not become hard to see. Furthermore, by reducing the wall thickness of the lens barrel or by omitting duplicate portions of the lens barrel wall, the entire lens can be made lighter in weight.

What is claimed is:

1. A lens device provided with a photo-taking optical system and a barrel holding said photo-taking optical system therein, said lens device having:

an auxiliary optical system insertable into and retractable from the optical path of said photo-taking optical system; and grip means protruding from the outer wall of said barrel in order that the user may hold said barrel, said grip means having containing means for containing therein said auxiliary optical system when retracted from the optical path of said photo-taking optical system, and said grip means having therein a control mechanism for said photo-taking optical system and said auxiliary optical system.

2. A lens device according to claim 1, wherein said grip means has a grip body and a grip cover engageable and disengageable with said grip body.

3. A lens device according to claim 1, wherein said grip means is constructed integrally with a housing which is a part of said barrel.

4. A lens device according to claim 3, wherein said housing contains therein said auxiliary optical system when inserted into the optical path of said photo-taking optical system.

5. A lens device according to claim 3, wherein said auxiliary optical system moves in the interior of said grip means when it is retracted from its inserted position in the optical path of said photo-taking optical system to said containing means.

6. A lens device having:

a photo-taking optical system;

an auxiliary optical system insertable into and retractable from the optical path of said photo-taking optical system;

a barrel holding said photo-taking optical system therein, said barrel containing therein said auxiliary optical system when inserted into the optical path of said photo-taking optical system, and having an opening in the outer wall thereof; and grip means for the user to hold said barrel, said grip means being attached to the outer wall of said barrel, said grip means having therein a control mechanism for said photo-taking optical system and said auxiliary optical system and having containing means for containing therein said auxiliary optical system when retracted from the optical path of said photo-taking optical system;

said auxiliary optical system being adapted to pass through said opening when it is retracted from its inserted position in the optical path of said photo-taking optical system within said barrel to said containing means of said grip means.

7. A lens device according to claim 6, wherein said opening is light-intercepted by said grip means.

8. A lens device according to claim 6, wherein said grip means has a grip body and a grip cover engageable and disengageable with said grip body.

9. A lens device according to claim 6, wherein said auxiliary optical system is an extender optical system.

10. A lens device having:

a photo-taking optical system;

an auxiliary optical system insertable into and retractable from the optical path of said photo-taking optical system, said auxiliary optical system when retracted from the optical path of said photo-taking optical system being positioned leaning in one direction relative to any plane containing the optic axis of said photo-taking optical system;

a barrel holding said photo-taking optical system therein, said barrel containing said auxiliary optical system therein when said auxiliary optical system is inserted in the optical path of said photo-taking optical system;

housing means protruding from the outer wall of said barrel and containing said auxiliary optical system therein when said auxiliary optical system is retracted from the optical path of said photo-taking optical system, said housing means protruding to the same side as said auxiliary optical system when retracted, relative to said any plane; and grip means attached to the outer wall of at least one of said barrel and said housing in order that the user may hold said barrel, said grip means being positioned leaning to the same side as said auxiliary optical system when retracted, relative to said any plane, said grip means having therein a control mechanism for said photo-taking optical system and said auxiliary optical system.

11. A lens device according to claim 10, wherein said grip means has a grip body and a grip cover engageable and disengageable with said grip body.

12. A lens device according to claim 10, wherein said auxiliary optical system is an extender optical system.

* * * * *